(12) United States Patent
Foss

(10) Patent No.: US 11,529,849 B2
(45) Date of Patent: Dec. 20, 2022

(54) WINDSHIELD INSTALLATION SYSTEM AND TRIANGULATION METHOD

(71) Applicant: Christian M. Foss, Wilmot, SD (US)

(72) Inventor: Christian M. Foss, Wilmot, SD (US)

(*) Notice: Subject to any disclaimer, the term of this patent is extended or adjusted under 35 U.S.C. 154(b) by 43 days.

(21) Appl. No.: 16/312,289

(22) PCT Filed: Jun. 26, 2017

(86) PCT No.: PCT/US2017/039340
§ 371 (c)(1),
(2) Date: Dec. 21, 2018

(87) PCT Pub. No.: WO2017/223573
PCT Pub. Date: Dec. 28, 2017

(65) Prior Publication Data
US 2019/0232761 A1    Aug. 1, 2019

Related U.S. Application Data

(60) Provisional application No. 62/354,403, filed on Jun. 24, 2016.

(51) Int. Cl.
*B60J 1/00*    (2006.01)
*B23P 6/00*    (2006.01)
(Continued)

(52) U.S. Cl.
CPC ............... *B60J 1/005* (2013.01); *B23P 6/00* (2013.01); *B23P 19/10* (2013.01); *B60J 1/004* (2013.01);
(Continued)

(58) Field of Classification Search
CPC ... B60J 1/004; B60J 1/005; B60J 1/006; B60J 1/007; Y10T 29/4973; Y10T 29/49902;
(Continued)

(56) References Cited

U.S. PATENT DOCUMENTS 4,998,711 A * 3/1991 Borg ...................... B25B 11/00
                                                        269/21
5,292,045 A * 3/1994 Mandel ................... B60R 9/00
                                                        224/309
(Continued)

*Primary Examiner* — Jermie E Cozart
(74) *Attorney, Agent, or Firm* — Jacob M. Ward; Ward Law Office LLC

(57) ABSTRACT

A vehicle windshield triangulation assembly (11), and triangulation method using it with a railing (22) fixed to a vehicle (16) via sliding/rotatable/orientation-adjustable/height-adjustable mounts (18). A sliding seat (21) on railing (22) receives the telescoping end (1) of assembly (11) after its two connected 360-degree rotation swivel clamps (7), each having a suction cup (8), are secured against the old windshield's (17) exterior surface. Assembly (11) triangulation transfers to a new/replacement windshield (17) by releasing suction cups (8) and pairing them in the same manner with the new/replacement windshield (17), and making needed height adjustment to a top stop (12/13) and the swivel clamp (7) remote from top stop (12/13). The telescoping end (1) of assembly (11) is then engaged with sliding seat (21), allowing one person to easily and accurately move the new windshield (17) into the same positioning of the old windshield (17). This triangulation method accommodates windshields (17) having any size and curvature, and installation of windshields (17) occurs without a dry set step, measuring, templating, or educated guessing being required.

20 Claims, 11 Drawing Sheets

(51) Int. Cl.
*B23P 19/10* (2006.01)
*B60J 1/02* (2006.01)
B25B 11/00 (2006.01)
B65G 49/06 (2006.01)

(52) U.S. Cl.
CPC .............. *B60J 1/02* (2013.01); *B23P 19/107* (2013.01); *B23P 2700/50* (2013.01); *B25B 11/005* (2013.01); *B60J 1/006* (2013.01); *B60J 1/007* (2013.01); *B65G 49/061* (2013.01); *Y10T 29/4973* (2015.01); *Y10T 29/49902* (2015.01)

(58) Field of Classification Search
CPC ........... B23P 6/00; B23P 19/10; B23P 19/107; B23P 2700/50; B25B 11/005
See application file for complete search history.

(56) References Cited

U.S. PATENT DOCUMENTS

| | | | | |
|---|---|---|---|---|
| 7,322,092 | B2* | 1/2008 | Adas | B66C 1/0225 |
| | | | | 29/468 |
| 8,672,309 | B2* | 3/2014 | Birkhauser | B62D 65/06 |
| | | | | 269/22 |
| 9,643,475 | B2* | 5/2017 | Finck | B25B 11/007 |
| 2005/0177991 | A1* | 8/2005 | Cole | B62D 65/02 |
| | | | | 29/467 |
| 2006/0156533 | A1* | 7/2006 | Mayhugh | B62D 65/06 |
| | | | | 29/468 |

* cited by examiner

WINDSHIELD INSTALLATION SYSTEM AND TRIANGULATION METHOD

TECHNICAL FIELD

This invention relates to systems and methods used for one-person replacement of a vehicle windshield, specifically to an elongated windshield triangulation assembly having components capable of multi-directional movement that permit its use with all vehicle windshields regardless of size and curvature, and which is used sequentially to first create a reproducible 3-point installer-selected alignment with portions of an existing windshield, one or more of its existing features, and/or one or more of the windshield's pre-applied markings, and then with the present invention windshield triangulation assembly in same 3-point alignment, the assembly becomes associated with the same windshield portions, existing features, and/or pre-applied markings on a replacement vehicle windshield, transferring the 3-point triangulated positioning obtained from the existing windshield (and also relating to the vehicle) to the replacement windshield for time savings and facilitated installation of the replacement windshield. Known and commonly used one-person windshield installation devices have one working member attached to a side window of the vehicle, but no transfer of triangulation information is involved. Known one-person windshield installation devices also teach a horizontal extension positioned across a replacement windshield for its lifting and movement relative to the vehicle. Although the present invention windshield triangulation assembly may be positioned in a horizontally extending orientation across a windshield, its primary function is to translate 3-point triangulation information from an old/existing windshield to a new/replacement windshield in any and all reproducible orientations related to the windshield for faster and more accurate windshield installation. No prior art is known to teach a windshield installation device using transferred triangulation information from an existing windshield to facilitate installation of a new/replacement windshield, as is contemplated by the present invention.

The most preferred embodiment of the present invention to accomplish the above triangulation information transfer is characterized by an elongated windshield triangulation assembly, an elongated railing having fixed association with the vehicle needing windshield replacement via sliding/rotatable/orientation-adjustable/height-adjustable mounts, and a sliding seat (also referred to herein as a setting socket or hood stop) on the railing that receives the telescoping end of the windshield triangulation assembly after its two connected 360-degree rotation swivel clamps, each having a suction cup connection to a vehicle windshield during use, are secured in a particular installer-selected alignment against the old windshield's exterior surface. When the triangulated positioning of the windshield triangulation assembly thus created is transferred to a new/replacement windshield, needed height adjustments are made to one swivel clamp and a stop associated with the other swivel clamp, and the telescoping end of the windshield triangulation assembly is also engaged, the new windshield is easily and accurately moved into the same positioning previously occupied by the old windshield. This triangulation method accommodates windshields having any size and curvature, and installation of windshields via the present invention system and method occurs without a dry set step, measuring, templating, or educated guessing being required. Furthermore, during its use, the present invention maintains the entirety of a replacement windshield's perimeter edge in an elevated position above a new bead of glue placed around the vehicle's windshield opening, until the installer can accurately position the replacement windshield's perimeter edge onto the new bead of glue. When a good seal is obtained, the installer can then move around the vehicle and use the attached present invention to slowly lower the remaining elevated portions of the replacement windshield in a precise and controlled manner toward adjacent portions of the new bead of glue, avoiding slippage of the replacement windshield relative to the glue and achieving/preserving a good, leak-resistant seal between them. Once the replacement windshield is fully seated on the glue, one or more pieces of easily removable tape may be applied to prevent replacement windshield slippage via gravity before the glue cures.

During part of its use and in advance of existing windshield removal, the present invention windshield triangulation assembly is aligned with the existing vehicle windshield and attached to its exterior surface to create a reproducible 3-point installer-selected alignment with portions of an existing windshield, one or more of its existing features, and/or one or more of the windshield's pre-applied markings Although the present invention's preferred position of use on both windshields (existing and replacement) typically employs a corner of the windshield, it is not limited thereto. When the present invention is generally in its desired position of use relative to an existing windshield, via elevational, lateral, and/or rotational movement of some or all of present invention components (assembly, rail, and/or rail mounts) relative to one another, the present invention becomes precisely adjusted to define the existing windshield's positioning relative to its supporting vehicle, and the established 3-point triangulation information for that particular alignment and placement is ready for transfer to a replacement windshield. As mentioned before, this triangulation step avoids a later dry set step (using the replacement windshield without a new bead of glue in place around the vehicle's windshield opening for visual alignment and/or marking purposes), preventing the installer from having to move and lift the replacement windshield twice onto the vehicle, saving time, conserving installer energy and stamina, and facilitating the installation process. The most preferred embodiments of the present invention system comprise a windshield triangulation assembly with an elongated rod connected via two 360-degree rotation swivel clamps to two suction cups. However, the present invention method can be implemented with one suction cup in contact with a corner of a windshield and establishing two of the 3-points needed for triangulation, with the third point established by use of a free floating extension member or a suction cup connected to a satellite extension member. In the alternative, the primary suction cup could establish only one point of the needed 3-points needed to establish triangulation information, with the other two points established by one or two satellite extension members (free floating or with suction cup attachment). The two 360-degree rotation swivel clamps contemplated by the most preferred embodiment of the present invention provide faster and more simplified triangulations, increasing accuracy and ease of use. A ball is connected in the most preferred embodiment of the present invention to one of two opposed ends of the elongated rod via an offset angle rod, with the opposed end of the offset angle rod connected to a telescoping extension arm the length of which can be adjusted by a quick-release clamp. During triangulation use, the ball engages a setting socket (also referred to herein as 'hood stop' or 'sliding seat') releasably mounted to the vehicle in a position adjacent or near to the windshield opening, and used with the ball as a downward stop for the elongated windshield triangulation assembly. While the setting socket may comprise a simple member with one suction cup, it may also have a more complex structure that includes slidable engagement with the upper channel of a rail while suction cups become slidably engaged with the rail's opposed lower track for temporary/releasable vehicle engagement. In addition, a vertically-adjustable roof setting stop (preferably having a wheeled configuration) is preferably used with the 360-degree rotation swivel clamp positioned more remotely from the ball, and is not directly connected to the elongated rod. The roof stop does not have to maintain an alignment with the two swivel clamps. Furthermore, the present invention elongated windshield triangulation assembly and setting socket can be associated with the left side or right side of a windshield needing replacement, depending upon installer preference, aligned in part with a mirror attached to the windshield's interior surface, or otherwise placed in a particular alignment with a portion of an existing windshield and/or its pre-applied features. In addition, the setting socket also preferably has a retaining lip so that the ball on the end of the offset angle rod cannot unexpected pop out of the top receiving portion of the setting socket.

BACKGROUND ART

The invention thought to be most similar in structure to that of the present invention is disclosed in U.S. Pat. No. 7,216,411 B1 to Mayhugh (2007). However, in contrast to the present invention, the Mayhugh device comprises a windshield glass anchor and a separate door glass anchor for mounting on the door glass on one side of a vehicle. In addition, the Mayhugh device requires an installer to walk back and forth from one side of the vehicle to the other, at least once during the installation process. The two Mayhugh anchors are free floating, connected by a pivoting structure that includes a tube extension and a pivot end. In contrast, the present invention in its most preferred embodiments is connected by suction cups to the same side of the windshield, and the ball on one end of its elongated rod engages a top receiving portion of a setting socket secured via a suction cup to the vehicle below its windshield opening. In addition, when using the Mayhugh invention, a windshield installer must first use a dry set step to mark windshield positioning with a piece of tape or other temporary marking means. Furthermore, after the glue is applied to the new/replacement windshield, an installer using the Mayhugh invention must rely at least in part on past installation experience to accurately place the new/replacement windshield against the vehicle without disrupting the applied glue so that a good seal can be achieved. Conversely, in the present invention precise triangulation infatuation provided by the windshield triangulation assembly and the setting socket associated with the telescoping ball end of the assembly is translated to a new windshield. In addition, the present invention maintains the new windshield in an elevated position above the vehicle's windshield opening during its initial alignment with the vehicle, after which the new/replacement windshield is precisely and accurately lowered into its desired position of use to provide a good seal against the vehicle with the pre-applied glue. Thus, the present invention has important advantages over the Mayhugh invention, and no windshield installation system or method is known to have all of the structural features and advantages of the present invention system and method.

DISCLOSURE OF INVENTION

The primary objective of this invention is to provide an improved windshield installation system and method that allows one person to install a vehicle windshield with precision and ease. It is also an objective of this invention to provide an improved vehicle windshield installation system and method that allows faster installations and eliminates the need for a dry set step, measuring templating, or educated guessing. A further object of this invention is to provide an improved vehicle windshield installation system and method that can be used with windshields of any size and any curvature. In addition, it is an objective of this invention to provide an improved vehicle windshield installation system and method that reduces the amount of training time needed for new installers. It is also an objective of this invention to provide an improved vehicle windshield installation system and method that allows an installer to work mainly from one side of the vehicle, and not have to move frequently back and forth from one side of the vehicle to the other. A further objective of this invention is to provide an improved vehicle windshield installation system and method that allows an installer to work from either side of a vehicle, according to preference.

The present invention is a vehicle windshield installation system and method allowing multiple adjustments during windshield installation to accommodate the installation of windshields having any size and any curvature. It comprises an elongated rod connected between two 360-degree rotation swivel clamps each having a suction cup connection to a vehicle windshield during use. During installation of a new/replacement windshield in a vehicle, the two swivel clamps with their suction cups are first placed in spaced-apart positions with a particular selected alignment on an existing windshield's exterior surface, thus establishing triangulation information relating to the existing windshield and/or one or more of the windshield's pre-applied markings After triangulation is complete, the suction cups are released from the old windshield and paired in the same particular alignment with the new/replacement windshield, and glue is then applied around the windshield opening for installation of the new/replacement windshield. By placement of the ball of the windshield triangulation assembly into the receiving portion of the setting socket (hood stop) and a roof stop against a portion of the vehicle roof, the new windshield can be accurately lowered into its permanent position on the vehicle without disrupting the glue, thereby obtaining a good seal between the windshield and the vehicle. Installation can occur without the installer having to move from one side of the vehicle to the other, saving time, and a dry set step, templating, measuring, or educated guessing required by many prior art windshield systems and methods is eliminated. Alignment of a new windshield through use of the present invention windshield triangulation assembly is faster, easier, and more precise than with prior art systems and methods, and it works with all vehicle windshields irrespective of size and curvature.

BEST MODE FOR CARRYING OUT THE INVENTION

Figure 9:
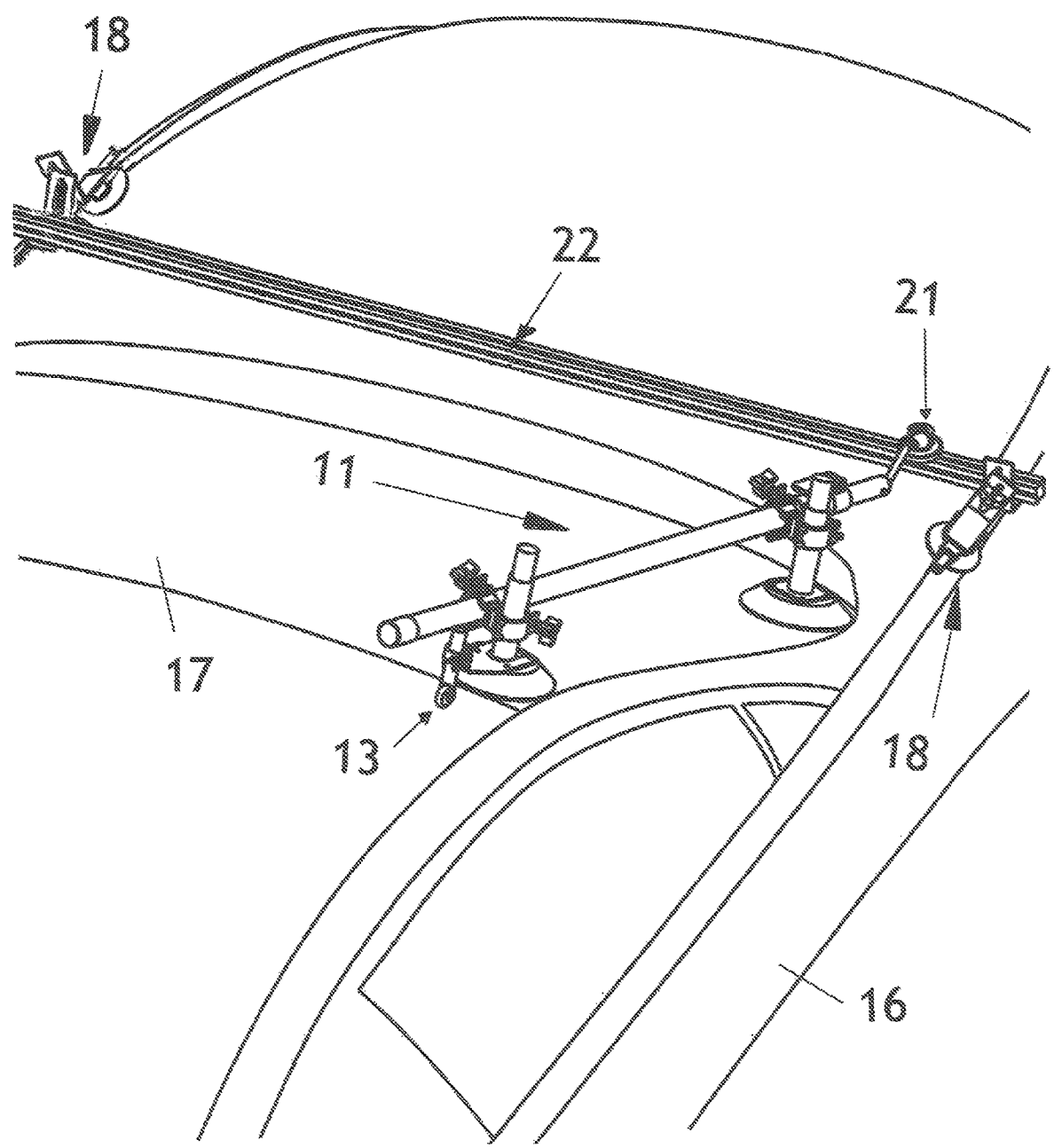
FIG. 9 is a perspective view from the top of the most preferred embodiment of the present invention windshield triangulation assembly, setting socket, rail, and two rail mounts secured to a vehicle and its windshield, with the two L-shaped brackets of each rail mount obliquely aligned with one another so that their quick-release suction cup attachment can achieve secure attachment to differing portions of the vehicle, each rail mount also having its suction cup positioned on a different side of the rail.
Figure 10:
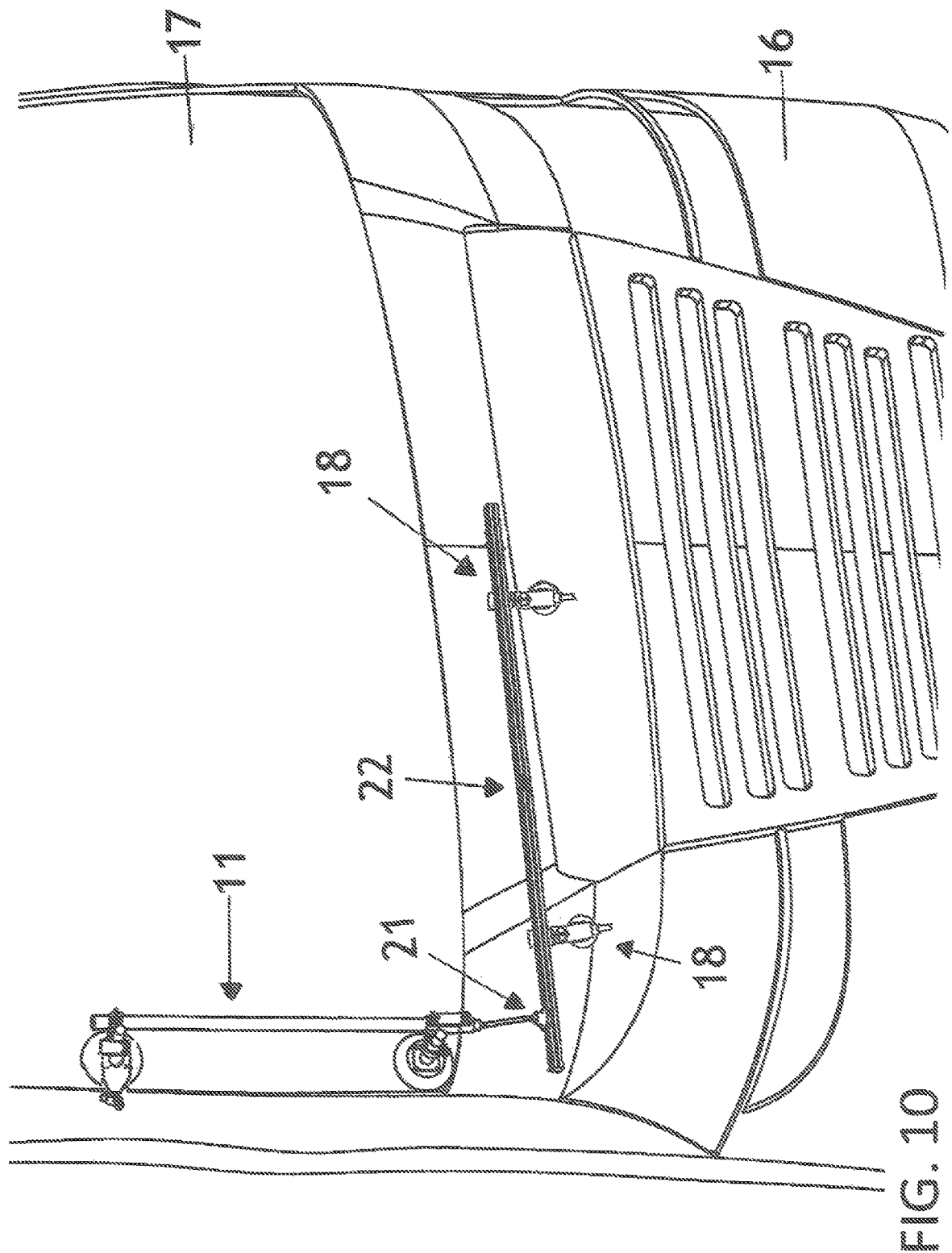
FIG. 10 is a front view of a vehicle with a vertically-extending windshield, such as a bus, recreational vehicle, or large truck, and the most preferred embodiment of the present invention windshield triangulation assembly, setting socket, rail, and rail mounts, temporarily secured to the vehicle and its windshield.
Figure 11:
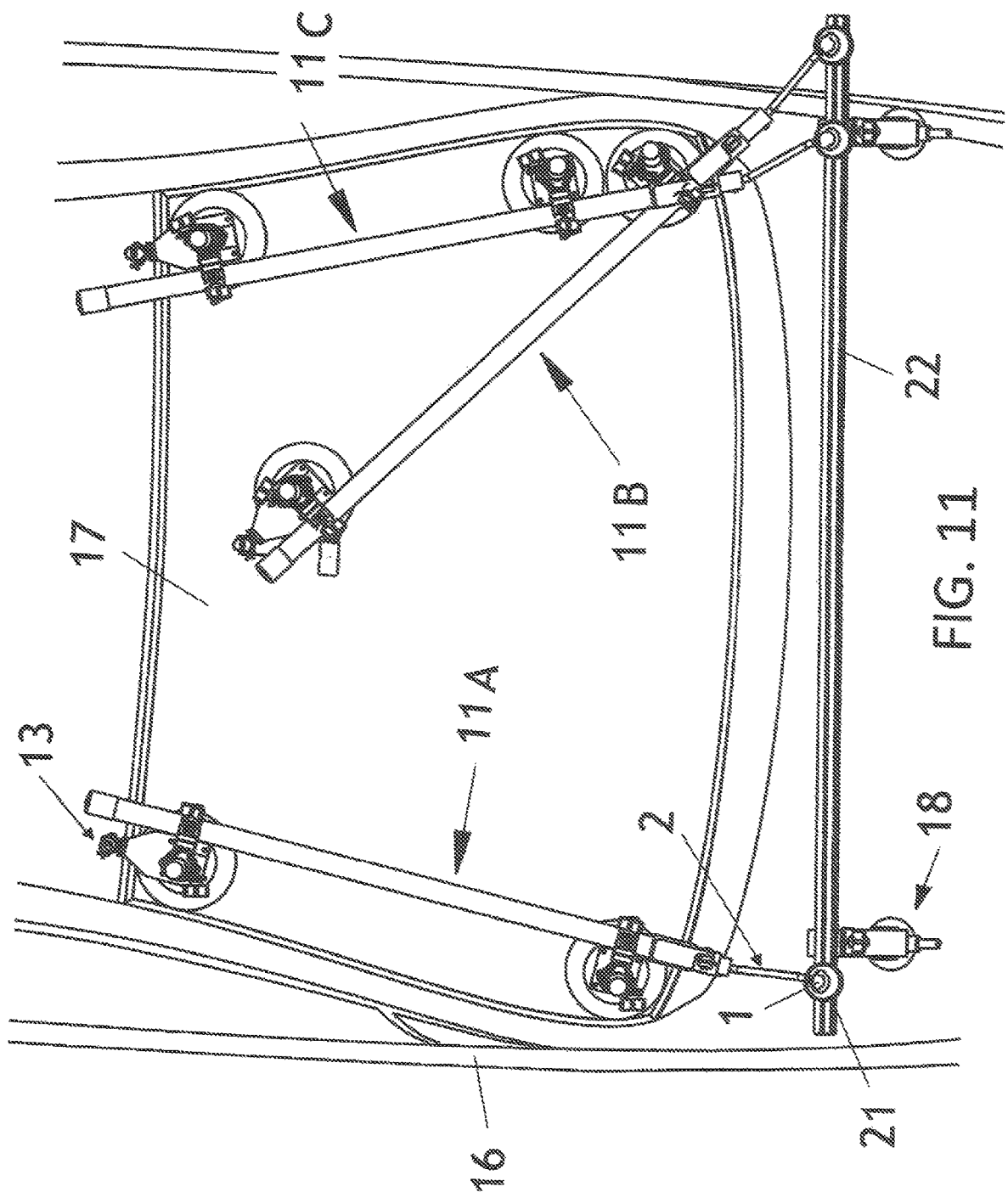
FIG. 11 is a front view of a windshield attached to a vehicle, and three most preferred embodiments of the present invention windshield triangulation assembly each engaging the same mounted rail with its own slidable setting socket to demonstrate several examples of differing alternative positions in which the assembly can be used to achieve triangulation for windshield replacement.

The most preferred embodiment of the present invention system and method is shown in FIGS. 1-11 and comprises a vehicle windshield triangulation assembly 11 and method allowing multiple adjustments during windshield 17 installation into a vehicle 16 and accommodating the installation of vehicle windshields 17 having any size and any curvature. For fast and efficient one-person vehicle windshield 16 installation, windshield triangulation assembly 11 preferably comprises an elongated rod 5 connected via two 360-degree rotation swivel clamps 7 each having an upright post suction cups (6, 8, with component 6 being pump assembly for suction cup 8). However, use of suction cup 8 in association with an upright post 6 is not critical, and many other easily-releasable suction cups are easily substituted. During installation of a new/replacement windshield 17 in a vehicle 16, FIGS. 1, 3, and 5-7 show the two upright post suction cups (6, 8) in one preferred position of use and in spaced-apart aligned positions along one side (and on top of) the windshield 17. Furthermore, although examples of particular alignment selections for windshield triangulation assembly 11 are shown in FIG. 11, additional particular alignment selections for windshield triangulation assembly 11 are also contemplated. The most preferred embodiment of the present invention system also has a ball 1 connected to one end of the elongated rod 5 via an offset angle rod 2

Figure 1:
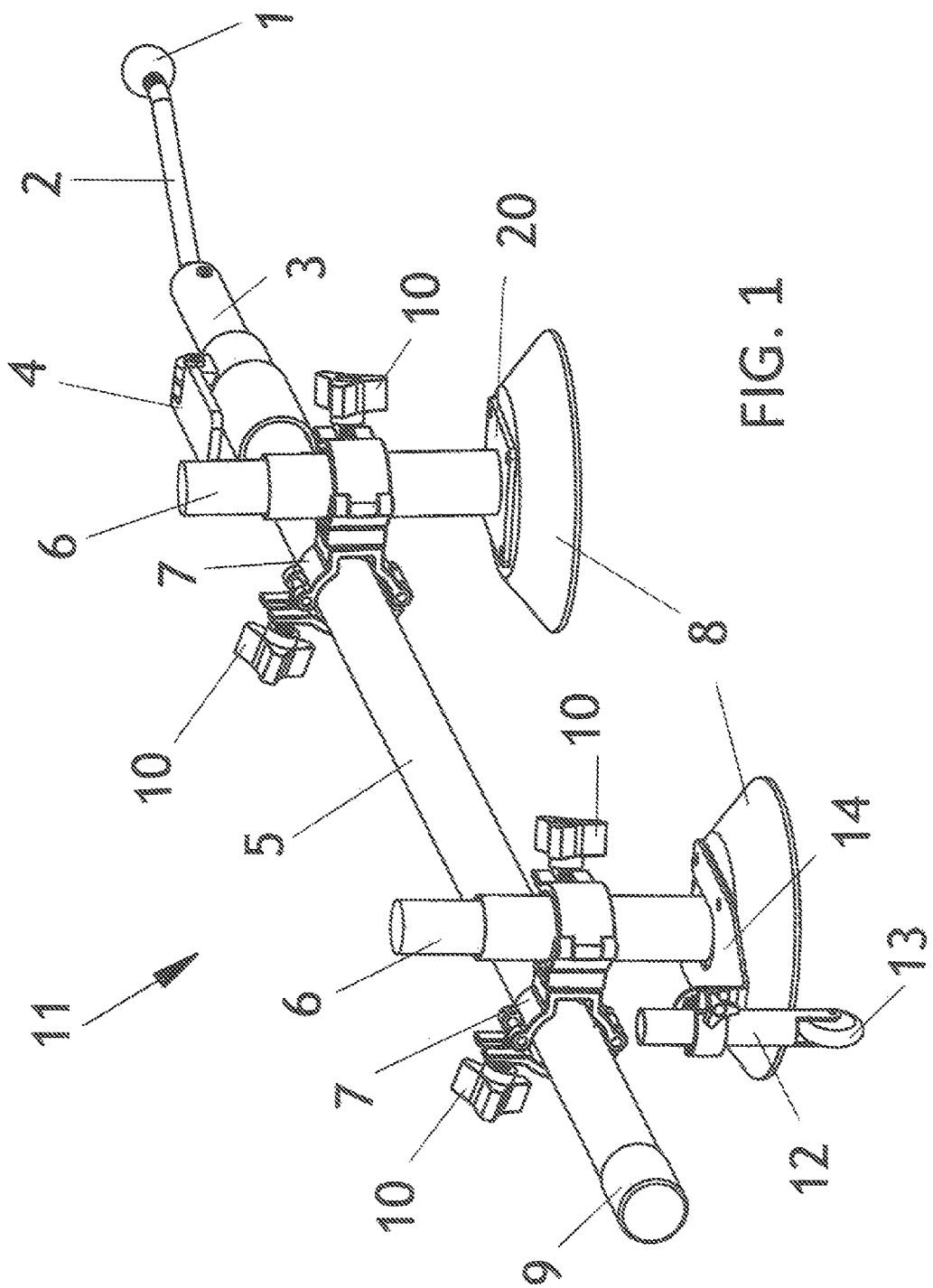
FIG. 1 is a perspective view from the side of the most preferred embodiment of the present invention windshield triangulation assembly showing its elongated rod connected between two 360-degree rotation swivel clamps each having a suction cup, the rod including one telescoping end component with an angled rod and ball, in addition to an optional height-adjustable stop having a wheeled configuration associated with the swivel clamp positioned most remotely from the ball.
Figure 2:
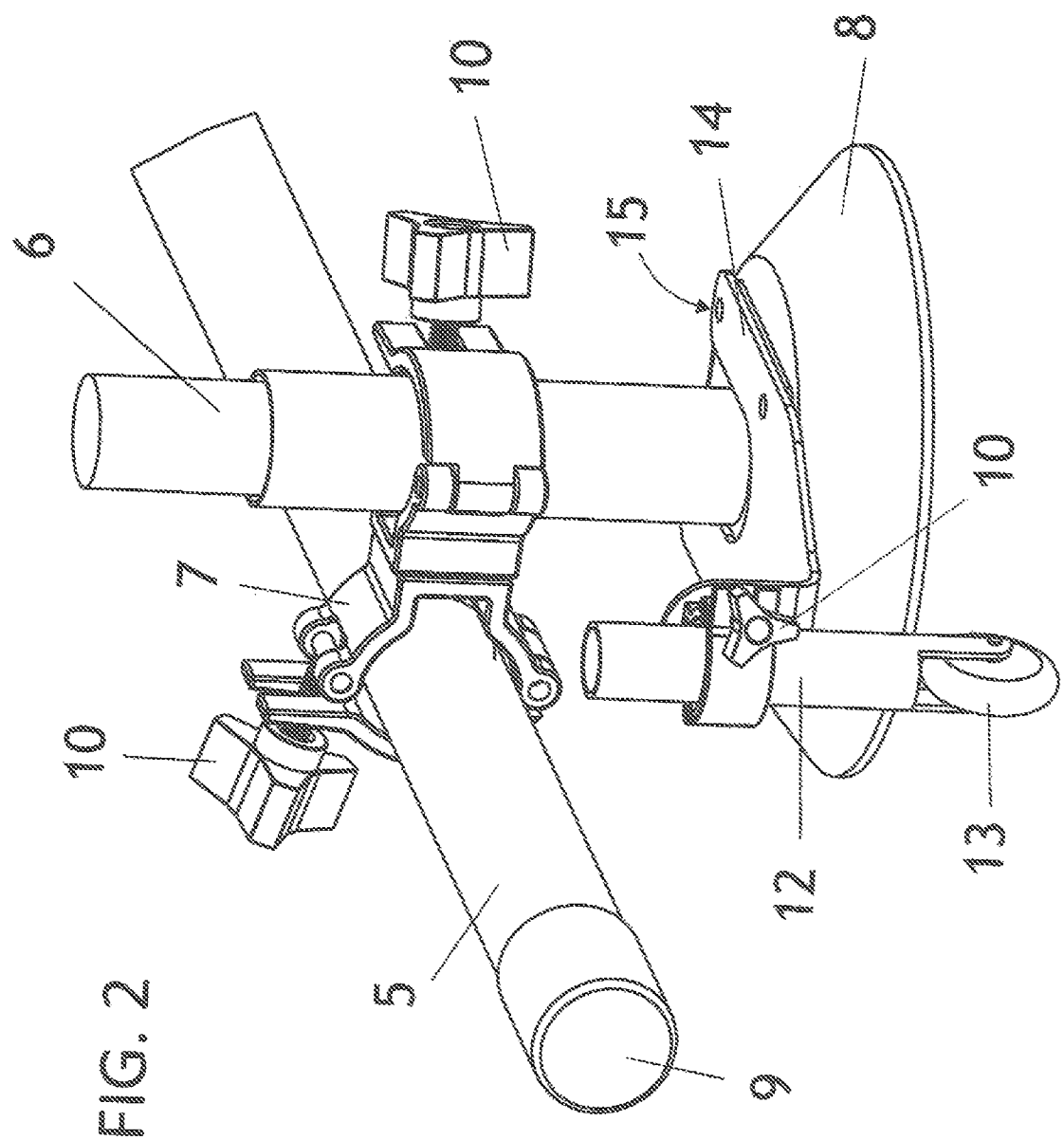
FIG. 2 is an enlarged perspective view of the height-adjustable stop and swivel clamp shown in FIG. 1, the height-adjustable stop secured to the swivel clamp via an attachment plate and a non-rotating clamp having hand-tightened adjustment means.

FIG. 1 is a perspective view from the side of the most preferred embodiment of the present invention windshield triangulation assembly 11 showing its elongated rod 5 connected between two 360-degree rotation swivel clamps 7 each having a suction cup 8, the rod 5 including one telescoping end component 3 with an angled rod 2 and a ball 1, in addition to an optional height-adjustable stop (12, 13) having a wheeled configuration associated with the swivel clamp 7 positioned most remotely from ball 1. In contrast, FIG. 2 is an enlarged perspective view of the height-adjustable stop (12, 13) and one swivel clamp 7 shown in FIG. 1, the height-adjustable stop (12, 13) secured to the swivel clamp 7 via an attachment plate 14 and a non-rotating clamp portion of plate 14 having hand-tightened adjustment means 10. The configuration shown for adjustment means 10 provides just one example thereof, and should not be considered as limited thereto. While FIG. 2 further shows preferred structure for the height-adjustable stop (12, 13), fastener holes 15, and attachment plate and clamp 14, it is not contemplated for the number, size, configuration, relative size, and replacement of fastener holes 15 to be limited to that shown in FIG. 2. Also shown in FIGS. 1-3, the reference number 9 is used to identify the end of elongated rod 5 remote from ball 1, and in FIGS. 1 and 3 the reference number 4 is used to identify the means for length adjustment of telescoping end component 3, while the reference number 20 is used to identify a non-height-adjustable plate associated with one of the suction cups 8.

Figure 3:
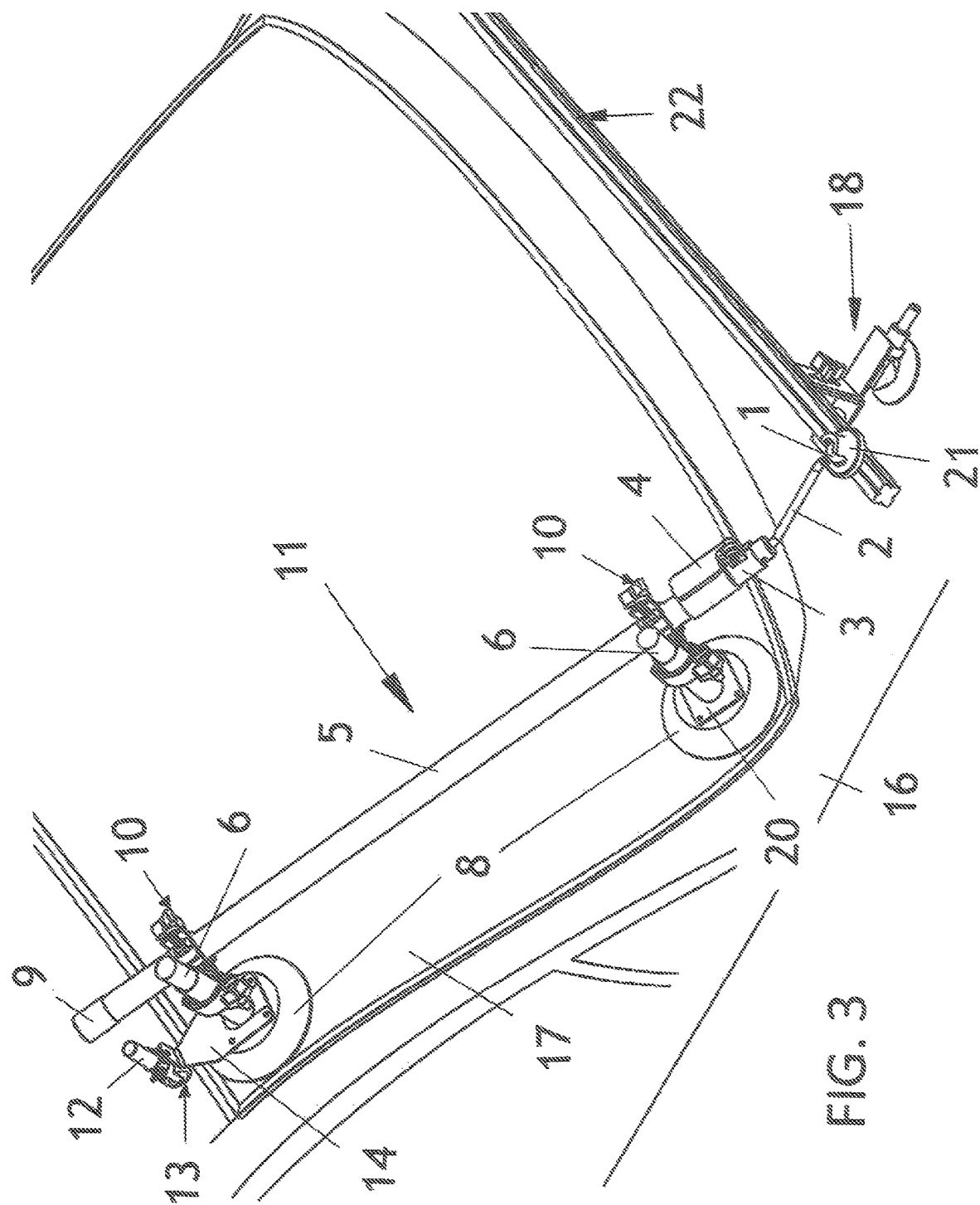
FIG. 3 is side view from the top and shows one example of positioning for the most preferred embodiment of the present invention windshield triangulation assembly previously illustrated in FIGS. 1-2, wherein the assembly is attached to one side of a vehicle windshield and the ball on one of its ends engages the receiving top portion of a setting socket slidingly engaged with a rail temporarily attached by an easily releasable mount to the vehicle's exterior surface below its windshield opening, the wheeled stop associated with the opposing end of the assembly also engaging a portion of the vehicle's exterior roof surface above the windshield opening, and both of the assembly's suction cups, each connected to a different one of the swivel clamps supporting the elongated rod connected between them, the suction cups having similar positioning on the windshield in contact with the same side edge thereof, one near to the roof stop and the other near to the hood stop, the assembly's two suction cups establishing precise triangulation information for the attached windshield.
Figure 4:
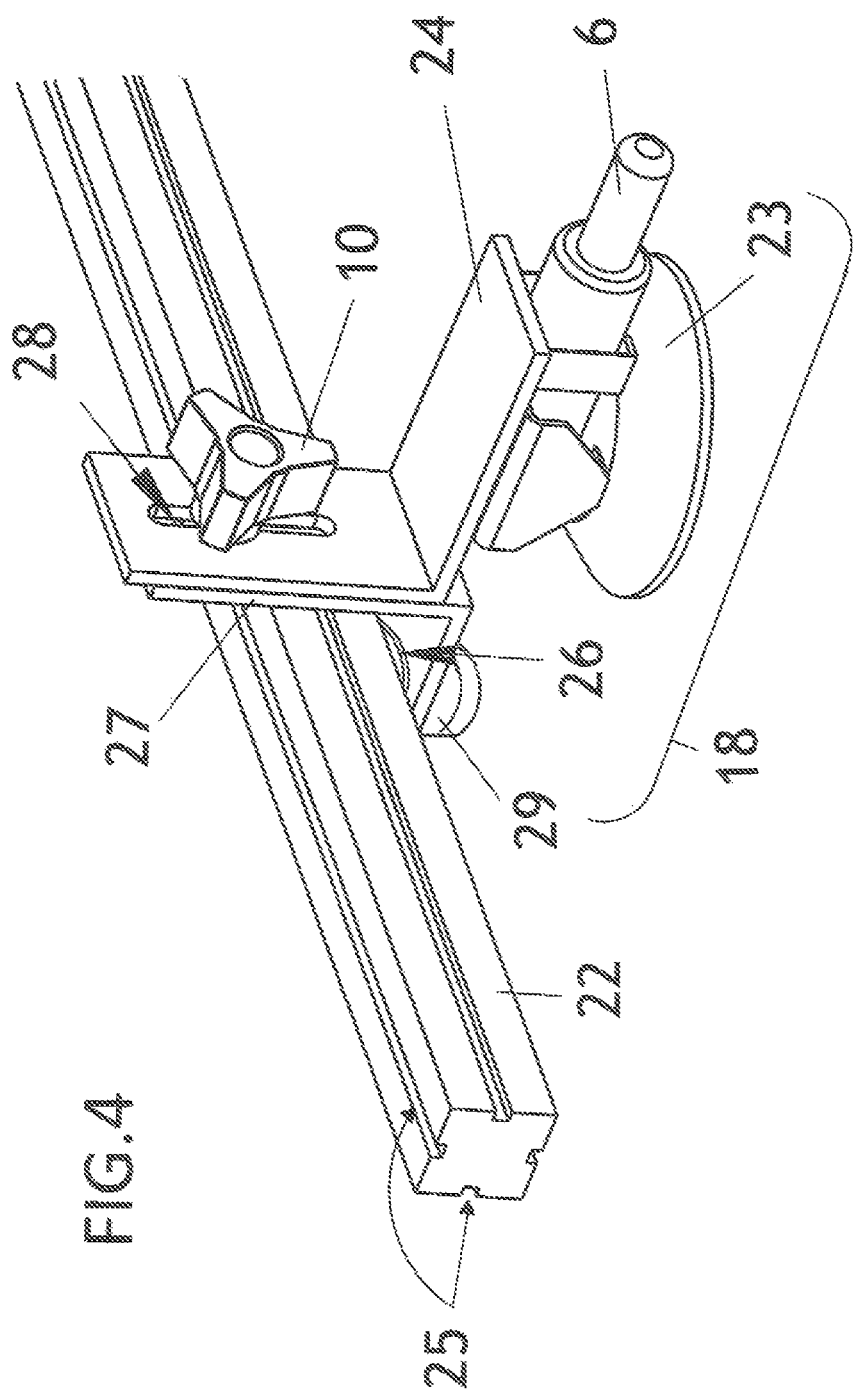
FIG. 4 is an enlarged perspective view of the most preferred embodiment of the present invention sliding/rotatable/orientation-adjustable/height-adjustable rail mount shown in FIG. 3.
Figure 5:
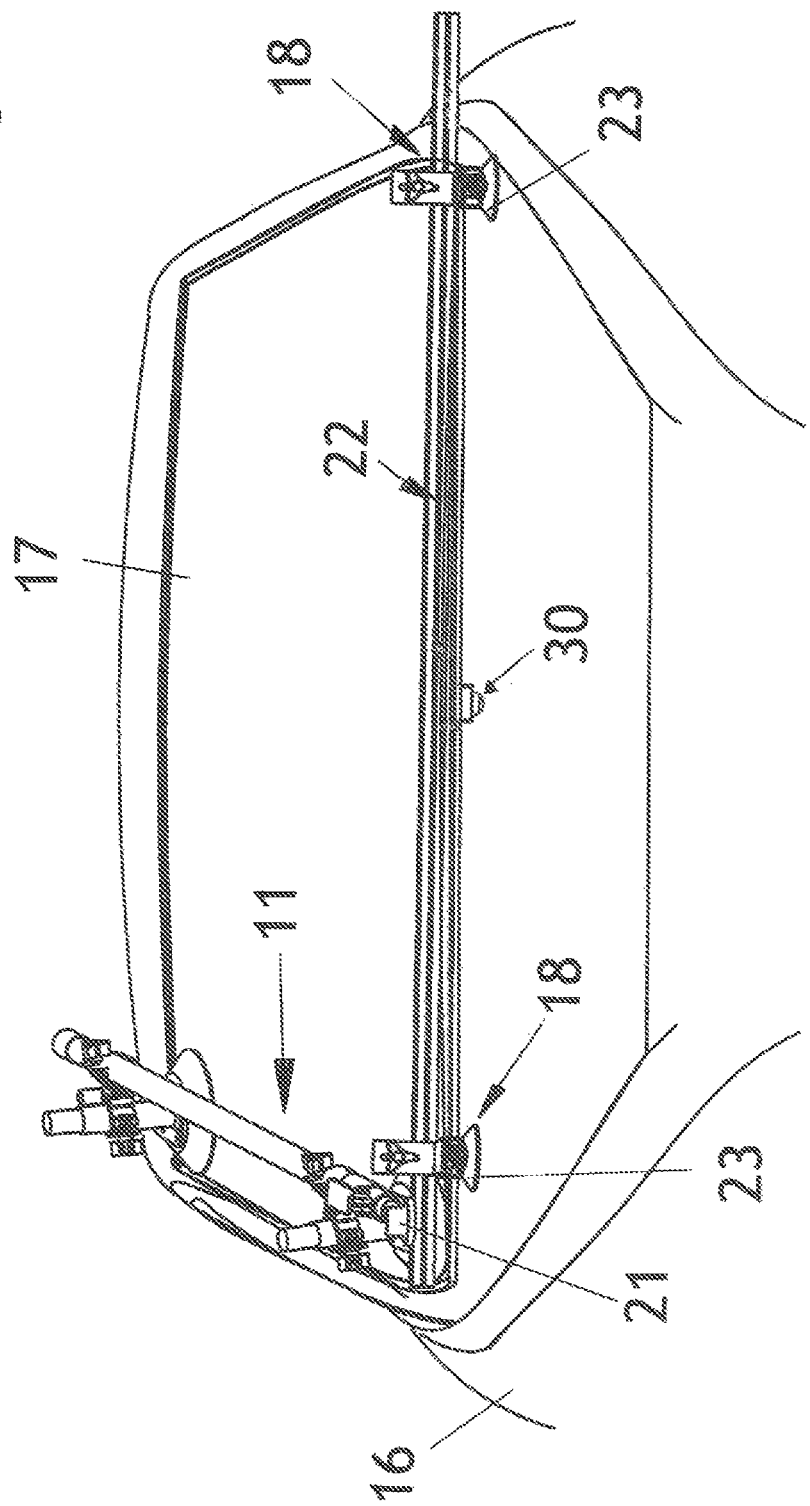
FIG. 5 is a front view of the most preferred embodiment of the present invention windshield triangulation assembly temporarily secured to a windshield in a position similar to that shown in FIG. 3, a setting socket slidingly engaged with a rail temporarily attached to the vehicle below its windshield opening and supporting the ball end of the assembly, the rail supported by two sliding/rotatable/orientation-adjustable/height-adjustable mounts with quick-release suction cup attachment, and the rail having an optional central bumper below it and extending toward the vehicle's exterior surface.
Figure 6:
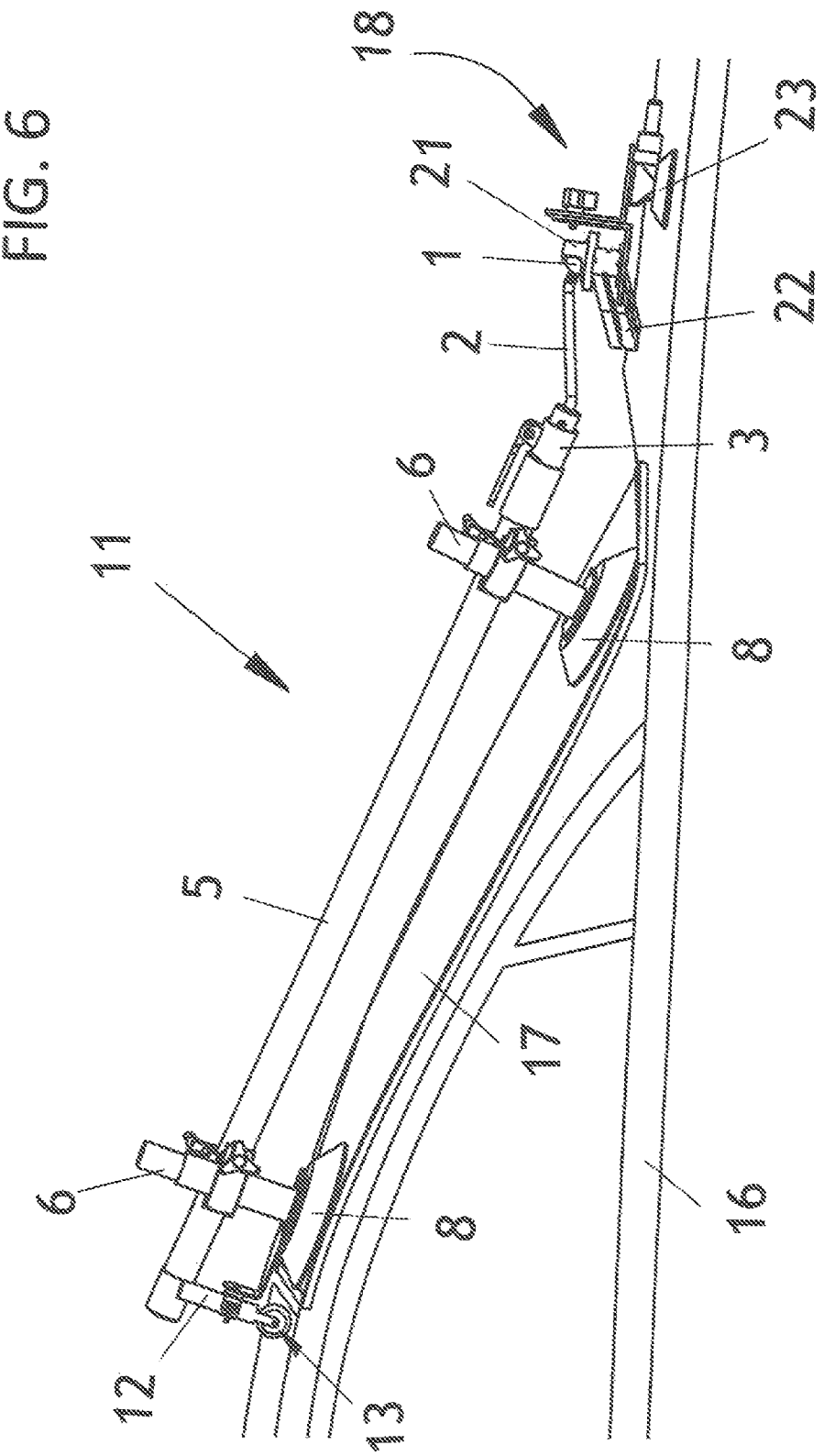
FIG. 6 is a side view of the most preferred embodiment of the present invention similar to that shown in FIGS. 3 and 5, but without the optional bumper situated beneath the rail, the two L-shaped brackets supporting the near end of the rail in alignment with one another and not obliquely rotated with respect to one another.

FIGS. 3 and 5-7 show windshield triangulation assembly 11 secured to a windshield 17 and associated with a setting socket 21, rail 22, and rail mounts 18. FIG. 3 is side view from the top and shows one example of positioning for the most preferred embodiment of the present invention windshield triangulation assembly 11 previously illustrated in FIGS. 1-2, wherein assembly 11 is attached to one side of a vehicle windshield 17 and the ball 1 on one of its ends engages the receiving top portion of a setting socket 21 slidingly engaged with a rail 22 temporarily attached by an easily releasable mount 18 to the exterior surface of a vehicle 16 below its windshield opening, the wheeled stop (12, 13) associated with the opposing end of assembly 11 also engaging a portion of the exterior roof surface of vehicle 16 above the windshield opening. Each of the suction cups 8 of assembly 11 are connected to a different one of the swivel clamps 7 supporting the elongated rod 5 connected between them, the suction cups 8 having similar positioning on the windshield in contact with the same side edge thereof, one near to the roof stop (12, 13) and the other near to the hood stop (21), the assembly's two suction cups 8 and ball 1 establishing precise triangulation information for the attached windshield 17. In contrast, FIG. 4 is an enlarged perspective view of the most preferred embodiment of present invention sliding/rotatable/orientation-adjustable/height-adjustable rail mount 18 shown in FIG. 3 and having two L-shaped brackets 24 and 27 in back-to-back orientation with one another, and secured together with a clamping knob 10 through height adjustment slots in vertically-extending portion of each bracket 24/27. As also seen in FIG. 4, L-shaped bracket 27 is supporting a rail 22 with longitudinal channels 25 shown on each of its four faces. A rubber stop 29 is shown under L-shaped bracket 27 to protect vehicle 16 paint and support weight. The number 26 in FIG. 4 identifies the swivel connection of L-shaped bracket 27 and means of sliding and rotatable connection to rail 22. The L-shaped bracket 24 in FIG. 4 is connected to a suction cup 23 and a pump assembly 6 for securely attaching suction cup 23 to the painted surface of vehicle 16. FIG. 5 is a front view of the most preferred embodiment of the present invention windshield triangulation assembly 11 temporarily secured to a windshield 17 in a position similar to that shown in FIG. 3, a setting socket 21 slidingly engaged with a rail 22 temporarily attached to the vehicle 16 below its windshield opening and supporting the ball 1 end of the assembly 11, the rail 22 supported by two sliding/rotatable/orientation-adjustable/height-adjustable mounts 18 each with quick-release suction cup attachment 23, and the rail 22 having an optional central bumper 30 below it and extending toward the exterior surface of vehicle 16. FIG. 6 is a side view of the most preferred embodiment of the present invention similar to that shown in FIGS. 3 and 5, but without the optional bumper 30 situated beneath the rail 22, the two L-shaped brackets (24 and 27) supporting the near end of rail 22 in alignment with one another and not obliquely rotated with respect to one another.

Figure 7:
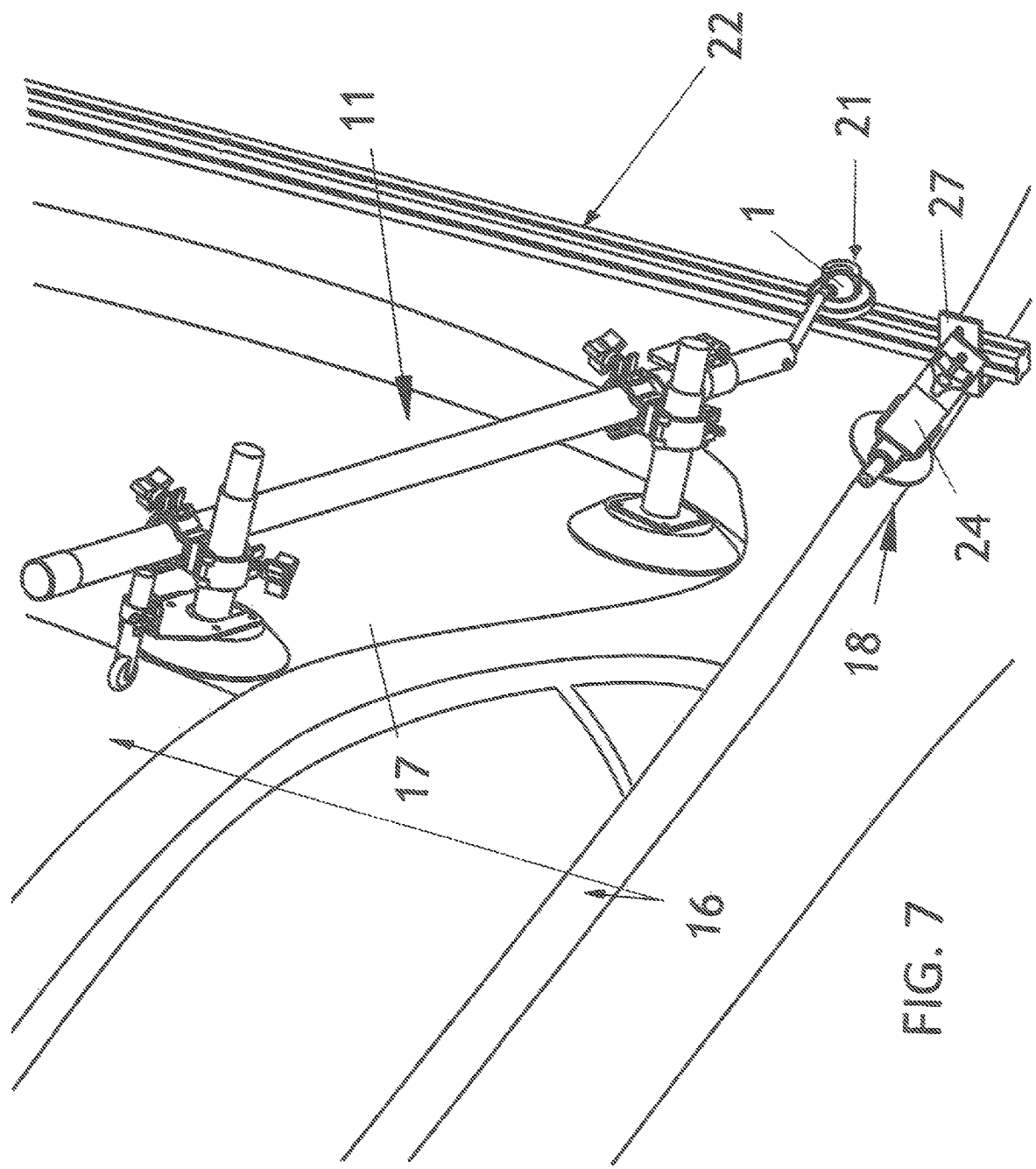
FIG. 7 is a top view of the most preferred embodiment of the present invention similar to that shown in FIGS. 3, 5, and 6, with one end of its windshield triangulation assembly seated in a setting socket slidingly engaged with the rail and the rail mount next to it having its two L-shaped brackets rotated to provide obliquely alignment with respect to one another, and also set at different elevations, so that its quick-release suction cup attachment can achieve secure attachment to the side of a vehicle, or other potentially non-level surface, instead of a relatively flattened portion of a vehicle hood.
Figure 8:
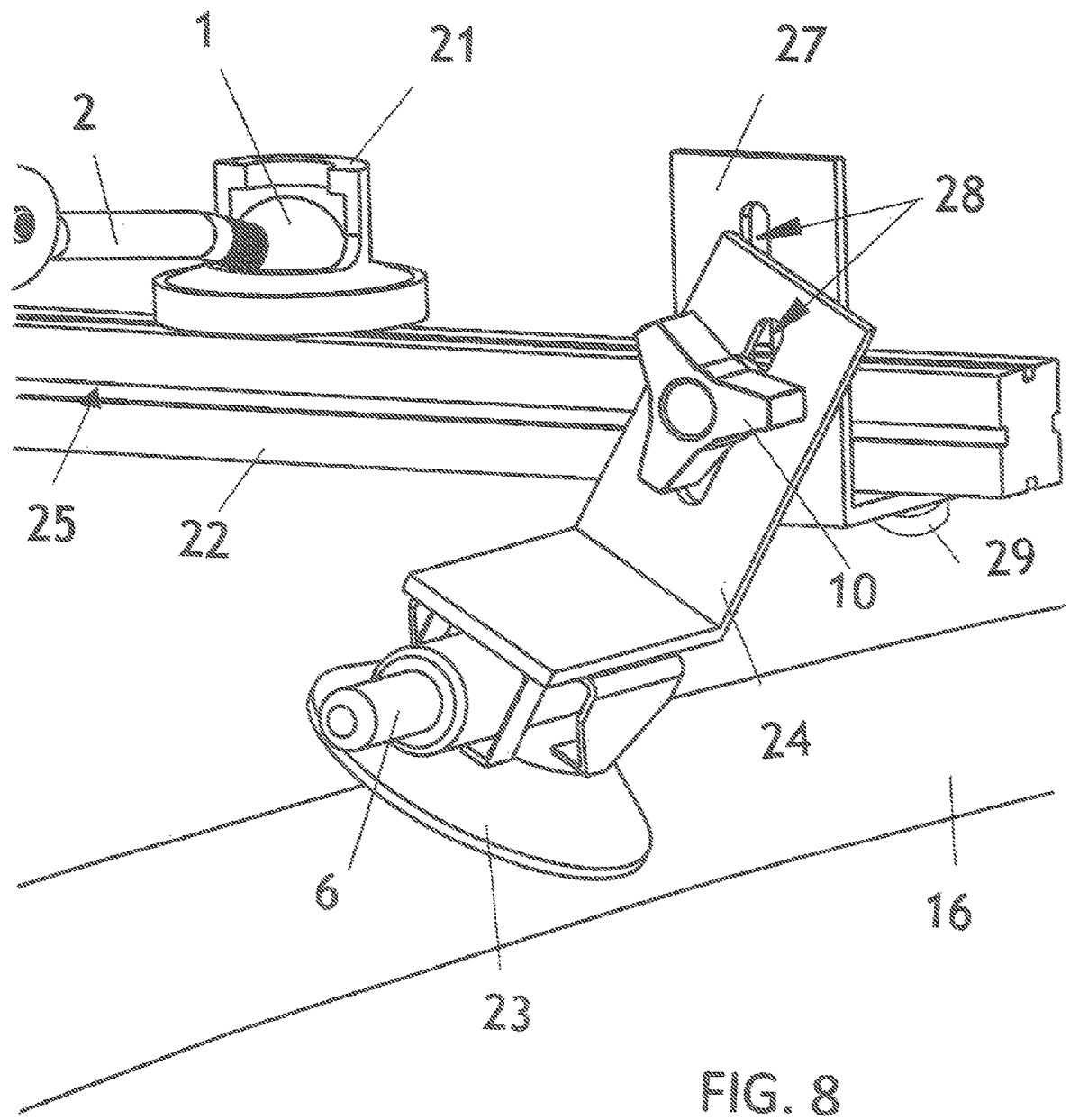
FIG. 8 is an enlarged view of the rail, sliding/rotatable/orientation-adjustable/height-adjustable rail mount, setting socket, and vehicle previously shown in FIG. 7.

FIGS. 7 and 9 show the present invention system with at least one of rail mounts 18 having its L-shaped brackets (24, 27) at differing elevations and/or in oblique alignment with one another, and FIG. 8 showing an enlarged view thereof. FIG. 7 is a top view of the most preferred embodiment of the present invention similar to that shown in FIGS. 3, 5, and 6, with one end of its windshield triangulation assembly 11 seated in a setting socket 21 slidingly engaged with the rail 22 and the rail mount 18 next to it having its two L-shaped brackets (24, 27) rotated to provide oblique alignment with respect to one another, and also set at different elevations, so that its quick-release suction cup attachment 23 can achieve secure attachment to the side of a vehicle 16, or other potentially non-level surface of vehicle 16, instead of a relatively flattened portion of the hood of vehicle 16. In contrast, FIG. 9 is a perspective view from the top of the most preferred embodiment of the present invention windshield triangulation assembly 11, setting socket 21, rail 22, and two rail mounts 18 secured to a vehicle 16 and its windshield 17, with the two L-shaped brackets (24, 27) of each rail mount 18 obliquely aligned with one another so that their quick-release suction cup attachment 23 can achieve secure attachment to differing portions of the vehicle 16, each rail mount 18 also having its suction cup 23 positioned on a different side of rail 22. FIG. 8 is an enlarged view of rail 22, sliding/rotatable/orientation-adjustable/height-adjustable rail mount 18, setting socket 21, and vehicle 16 previously shown in FIG. 7.

FIGS. 10 and 11 show differing examples of use for the most preferred embodiment of the present invention system. FIG. 10 is a front view of a vehicle 16 with a vertically-extending windshield 17, such as a bus, recreational vehicle, or large truck, and one example of positioning for the most preferred embodiment of the present invention windshield triangulation assembly 11, setting socket 21, rail 22, and rail mounts 18, all temporarily in fixed relation to the vehicle and/or its windshield during windshield 17 replacement until the triangulation information associated with the particular alignment of windshield triangulation assembly 11 relative to the old windshield 17 and vehicle 16 is transferred to the new/replacement windshield and the new/replacement windshield 17 is lowered into the windshield opening (not shown) of vehicle 16 and against the glue (not shown) applied around the windshield opening to fix the windshield in its desired position of use once the glue sets. In the alternative, FIG. 11 is a front view of a windshield 17 attached to a vehicle 16, and three most preferred embodiments of the present invention windshield triangulation assembly 11A, 11B, and 11C each engaging the same mounted rail 22 with its own slidable setting socket 21 to demonstrate several examples of differing alternative positions in which the assembly 11 can be used to achieve triangulation for windshield replacement according to the present invention triangulation method. Although the present invention's preferred position of use on both windshields 17 (existing and replacement) typically employs a corner of the windshield 17, it is not limited thereto, and during part of its use and in advance of existing windshield removal, the present invention windshield triangulation assembly may be aligned with the existing vehicle windshield and attached to its exterior surface to create a reproducible 3-point installer-selected alignment with portions of an existing windshield, one or more of its existing features, and/or one or more of the windshield's pre-applied markings.

While the written description of the invention herein is intended to enable one of ordinary skill to make and use its best mode, it should also be appreciated that the invention disclosure only provides examples of specific embodiments and methods, and many variations, combinations, and equivalents also exist which are not specifically mentioned. The present invention should therefore not be considered as limited to the above-described embodiments, methods, and examples, but instead encompassing all embodiments and methods identified in the accompanying claims, and also within the scope and spirit of the invention.

INDUSTRIAL APPLICABILITY

This invention relates to systems and methods used for one-person replacement of a vehicle windshield regardless of size and curvature, and which is used sequentially in particular installer-selected 3-point alignment with an existing windshield, and the same particular 3-point alignment with a replacement vehicle windshield, establishing triangulated information relating to the windshield and also relating to the vehicle, that becomes transferred to the replacement windshield for time savings and facilitated installation of the replacement windshield. Known and commonly used one-person windshield installation devices have one working member attached to a side window of the vehicle, but no transfer of triangulation information is involved. Known one-person windshield installation devices also teach a horizontal extension positioned across a replacement windshield for its lifting and movement relative to the vehicle. Although the present invention windshield triangulation assembly may be in a horizontally extending orientation across a windshield, its primary function is to translate triangulation information to the new/replacement windshield for faster and more accurate windshield installation. No prior art is currently known to teach a windshield installation device using transferred triangulation information from an existing windshield to facilitate installation of a replacement windshield, prevent the installer from having to move and lift the replacement windshield twice onto the vehicle, and conserve installer energy and stamina.

Also during its use, the present invention maintains the entirety of a new/replacement windshield's perimeter edge in an elevated position above a new bead of glue placed around the vehicle's windshield opening, until the installer can accurately position the replacement windshield's opposing perimeter edge onto the new bead of glue. When a good seal is obtained, the installer can then move around the vehicle and use the attached present invention to slowly lower the remaining elevated portions of the replacement windshield in a precise and controlled manner toward adjacent portions of the new bead of glue, avoiding slippage of the replacement windshield relative to the glue and achieving/preserving a good, leak-resistant seal between them. Once the replacement windshield is fully seated on the glue, one or more pieces of easily removable tape may be applied to prevent replacement windshield slippage via gravity before the glue cures. The primary objective of this invention is to provide an improved windshield installation system and method that allows one person to install a vehicle windshield. It is also allows faster installations, eliminates the need for a dry set step, measuring, templating, and/or educated guessing, reduces the amount of training time needed for new installers, and allows an installer to work from either side of the vehicle, according to preference.

What is claimed is:

1. A triangulation method for replacing the windshield of a vehicle, said method is characterized by the steps of:
providing a vehicle with an existing windshield in a windshield opening, said windshield having a plurality of identifiable elements selected from a group consisting of structural design features, markings, and pre-applied features, a replacement windshield for said vehicle, at least one suction cup assembly, and at least one alignment guide in association with said at least one suction cup assembly;
selecting three of said identifiable elements;
securing said at least one suction cup assembly to said existing windshield adjacent to two of said selected identifiable elements and also moving said at least one alignment guide relative to said existing windshield and affixing-said at least one alignment guide adjacent to a different one of said selected identifiable elements, thereby creating reproducible 3-point triangulation alignment information;
removing said at least one suction cup assembly and said at least one alignment guide from said existing windshield while preserving said reproducible 3-point triangular alignment information; and
applying said at least one suction cup assembly and said at least one alignment guide to said replacement windshield, transferring said reproducible 3-point triangulation alignment information to said replacement windshield, wherein said reproducible 3-point triangulation alignment information allows said replacement windshield to be accurately installed in said windshield opening of said vehicle.

2. The method of claim 1 wherein said at least one alignment guide is a suction cup.

3. The method of claim 2 further characterized by the steps of providing an elongated rod, and connecting said suction cups with said elongated rod.

4. The method of claim 3 wherein said elongated rod is further characterized on one end by a telescoping end component having an angled rod and connected ball.

5. The method of claim 4 further characterized by the step of providing a rail, a plurality of rail mounts, and a setting socket, the step of using said rail mounts to support said rail on said vehicle, and the step of supporting said setting socket on said rail in a position to receive said ball.

6. The method of claim 5 wherein said setting socket has a retaining lip for said ball.

7. The method of claim 5 wherein said rail is further characterized by a-longitudinal channels in which said rail mounts and said sliding socket are slidably engaged.

8. The method of claim 5 wherein said rail is further characterized by opposing sides and said rail mounts are each further characterized by at least two L-shaped brackets rotatable relative to said rail for movement from one of said opposing sides to the other, said L-shaped brackets also orientation-adjustable with respect to one another when connected together and height-adjustable with respect to one another when connected together.

9. The method of claim 5 further characterized by the step of providing an elevation adjustable stop, the step of associating said elevation adjustable stop with one of said suction cups remote from said ball, and the step of changing the elevation of said elongated rod via elevation change of said stop and the one of said suction cups adjacent to said ball.

10. The method of claim 5 further characterized by said stop having a wheeled configuration.

11. A triangulation system used according to the method of claim 1 for expedited and accurate replacement of an existing vehicle windshield having at least three identifiable elements with a new windshield having the same identifiable elements, said system characterized by three suction cups associated with two 360-degree rotation swivel clamps connected by an elongated rod, wherein when said two swivel clamps are secured adjacent to three of the identifiable elements, thereby creating reproducible 3-point triangulation alignment information, and said suction cups are applied to the replacement windshield, transferring said reproducible 3-point triangular alignment information to the replacement windshield, accurate installment of the replacement windshield is achieved.

12. The system of claim 11 wherein said elongated rod has opposing ends, and is further characterized on one of said opposing ends by a telescoping component having an angled rod and connected ball.

13. The system of claim 12 wherein said telescoping component is further characterized by 360-degree rotation.

14. The system of claim 13 further characterized by an elevation adjustable stop associated with one of said suction cups remote from said ball, allowing a change in elevation of said elongated rod via elevation change of said stop and the one of said suction cups adjacent to said ball.

15. The system of claim 14 further characterized by said stop having a wheeled configuration.

16. The system of claim 12 further characterized by a rail, and a plurality of rail mounts supporting said rail, and a setting socket supported on said rail in a position to receive said ball.

17. The system of claim 16 wherein said setting socket is further characterized by a ball-confining retaining lip for said ball.

18. The system of claim 16 wherein said rail is further characterized by a plurality of longitudinal channels in which said rail mounts and said setting socket are slidably engaged.

19. The system of claim 16 wherein said rail is further characterized by opposing sides and said rail mounts are each further characterized by at least two L-shaped brackets rotatable relative to said rail for movement from one of said opposing sides to the other, said L-shaped brackets also orientation-adjustable with respect to one another when connected together and height-adjustable with respect to one another when connected together.

20. The system of claim 19 wherein said L-shaped brackets are further characterized by use in pairs, and one of said L-shaped brackets in each said pair associated with a bottom stop and the other one of said L-shaped brackets in each pair associated with a bottom suction cup.

* * * * *